United States Patent [19]
Hatcho et al.

[11] Patent Number: 5,555,724
[45] Date of Patent: Sep. 17, 1996

[54] CAPACITY DETERMINING SYSTEM IN EXHAUST EMISSION CONTROL UNIT FOR INTERNAL COMBUSTION ENGINE

[75] Inventors: Seiji Hatcho; Yuichi Shimasaki; Takuya Aoki; Seiji Matsumoto; Hiroaki Kato; Takashi Komatsuda; Akihisa Saito; Toshikazu Oketani, all of Wako, Japan

[73] Assignee: Honda Giken Kogyo Kabushiki Kaisha, Tokyo, Japan

[21] Appl. No.: 377,740

[22] Filed: Jan. 25, 1995

[30] Foreign Application Priority Data

Jan. 25, 1994 [JP] Japan ................................. 6-006548

[51] Int. Cl.⁶ ............................................... F01N 3/28
[52] U.S. Cl. ............................ 60/276; 60/297; 60/311
[58] Field of Search ........................... 60/274, 276, 297, 60/311

[56] References Cited

U.S. PATENT DOCUMENTS 5,315,824  5/1994  Takeshima ............................. 60/297
5,379,586  1/1995  Honji .................................... 60/297
5,388,405  2/1995  Fujishita .............................. 60/297

FOREIGN PATENT DOCUMENTS 4-105925  9/1992  Japan .

Primary Examiner—Douglas Hart
Attorney, Agent, or Firm—Nikaido, Marmelstein, Murray & Oram LLP

[57] ABSTRACT

An adsorbing capacity determining apparatus is provided for determining the adsorbing capacity of an unburned component adsorbing device in an exhaust system for an internal combustion engine. The adsorbing capacity determining apparatus comprises upstream and downstream air-fuel ratio detectors, respectively coupled upstream and downstream from the unburned component adsorbing device, a temperature sensor for sensing the temperature of the unburned component adsorbing means and a computer for determining the adsorption capacity as a function of the outputs of the system and downstream air-fuel ratio detectors, when the temperature is within a predetermined range.

3 Claims, 2 Drawing Sheets ns. 5,555,724

CAPACITY DETERMINING SYSTEM IN EXHAUST EMISSION CONTROL UNIT FOR INTERNAL COMBUSTION ENGINE

BACKGROUND OF THE INVENTION

1. Field of the Invention

The present invention relates to an adsorbing capacity determining system in an exhaust emission control unit for an internal combustion engine in which an unburned component adsorbing means is provided for temporarily adsorbing an unburned component in the exhaust gas from the engine.

2. Description of the Prior Art

An exhaust emission control unit is conventionally known, for example, as in Japanese Utility Model Application Laid-open No. 105925/92. The exhaust emission control unit includes an unburned component adsorbing means provided in an exhaust system for temporarily adsorbing an unburned component in the exhaust gas in order to prevent the unburned component from being released to the atmosphere when an exhaust emission control catalyst is inactivated during a cold start of an internal combustion engine or at other times.

The unburned component adsorbing means is constructed using granular activated carbon or zeolite and adsorbs an unburned component of the exhaust gas comprising hydrocarbon(s). When the capacity for adsorbing the unburned component is reduced due to a secular change or the like, there is a possibility that the unburned component is directly released into the atmosphere without adsorption.

SUMMARY OF THE INVENTION

The present invention has been accomplished with such circumstance in view, and it is an object of the present invention to provide a capacity determining system in an exhaust emission control unit for an internal combustion engine, wherein the adsorbing capacity of the unburned component adsorbing means can be easily and reliably determined to prevent the unburned component from being released to the atmosphere.

To achieve the above object, the present invention provides a capacity determining system in an exhaust emission control unit for an internal combustion engine. An unburned component adsorbing means is provided in an exhaust system in the internal combustion engine for temporarily adsorbing an unburned component in the exhaust gas. The capacity determining system comprising: upstream and downstream air-fuel ratio detecting means connected respectively upstream and downstream of the unburned component adsorbing means, for detecting air-fuel ratios in the exhaust gas at locations upstream and downstream of the unburned component adsorbing means; an unburned component adsorbing state detecting means for detecting a state in which the unburned component adsorbing means is in an adsorbing state for adsorbing the unburned component or in a adsorbing state for adsorbing the unburned component; and a determining means for determining the adsorbing capacity of the unburned component adsorbing means on the basis of values detected by the upstream and downstream air-fuel ratio detecting means when the unburned component adsorbing state detecting means has detected that the unburned component adsorbing means is in an adsorbing state or in a desorbing state.

With the above arrangement, it is possible to reliably determine or judge the adsorbing capacity or ability of the unburned component adsorbing means. Thus, it is possible to prevent the unburned component from being released to the atmosphere by replacing the adsorbent with a new adsorbent upon determining that the adsorbing capacity has deteriorated.

The above and other objects, features and advantages of the invention will become apparent from the following description of the preferred embodiments taken in conjunction with the accompanying drawings.

DESCRIPTION OF THE PREFERRED EMBODIMENT

The present invention will now be described by way of a preferred embodiment with reference to the accompanying drawings.

Figure 1:
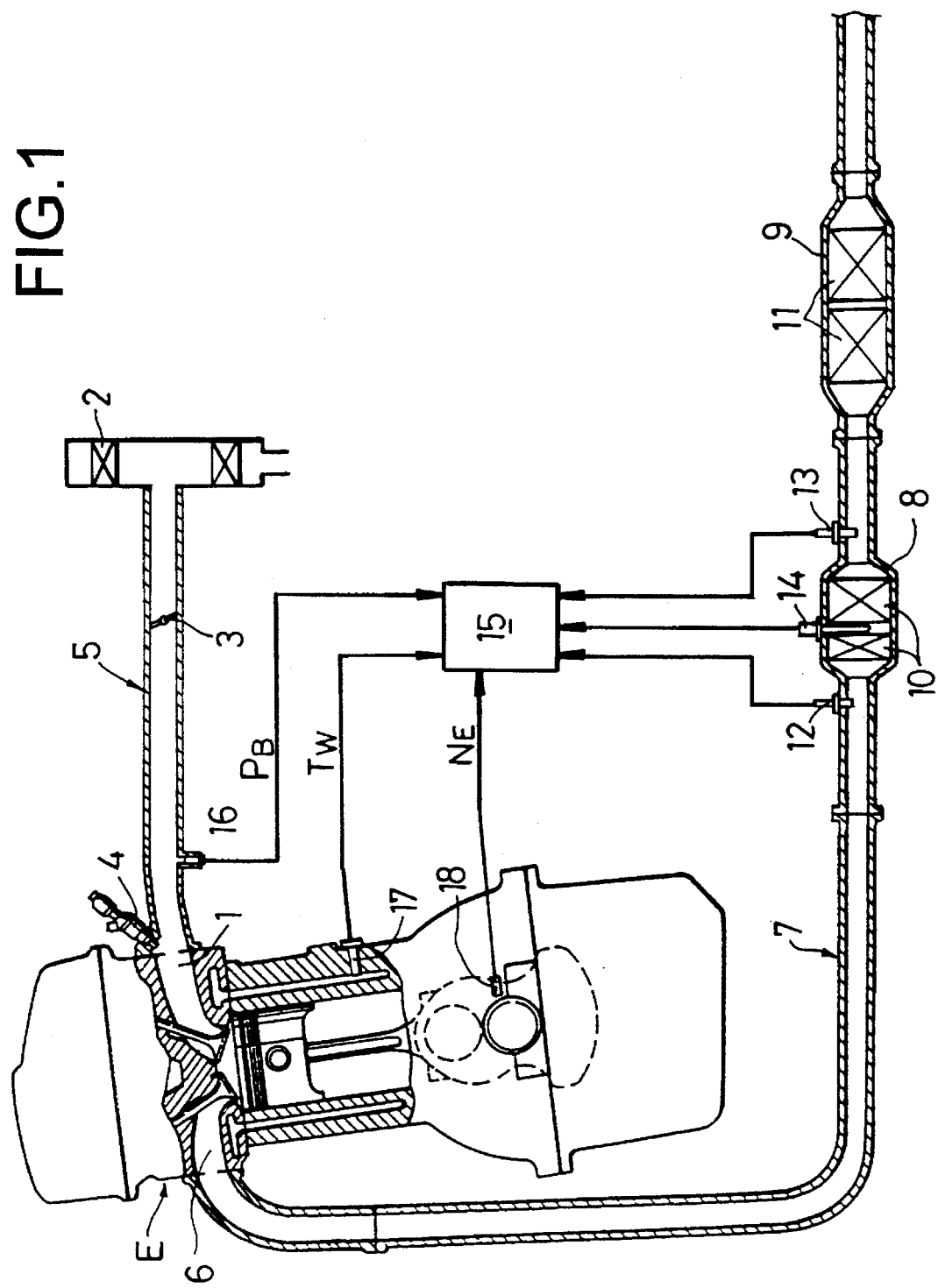
FIG. 1 is an illustration of intake and exhaust systems in an internal combustion engine.

Referring first to FIG. 1, an intake system 5 includes an air cleaner 2, a throttle valve 3 and a fuel injection valve 4. The intake system is connected to an intake port 1 in an internal combustion engine E. An unburned component adsorbing means 8 for temporarily adsorbing an unburned component in the exhaust gas, and an exhaust emission control catalytic converter 9 are incorporated into an exhaust system 7 connected to an exhaust port 6 in the internal combustion engine E. The unburned component adsorbing means 8 includes an adsorbent 10 such as granular activated carbon and zeolite within a casing, and the exhaust emission control catalytic converter 9 includes a ternary catalyst 11 within a casing.

In the exhaust system 7, an upstream air-fuel ratio detecting means 12 for detecting an air-fuel ratio $(A/F)_U$ in exhaust gas, is positioned upstream of the unburned component adsorbing means 8, and a downstream air-fuel ratio detecting means 13 is positioned between the unburned component adsorbing means 8 and the exhaust emission control catalytic converter 9, for detecting an air-fuel ratio $(A/F)_D$.

The unburned component adsorbing means 8 is provided with a temperature detector 14 which functions as an unburned component adsorbing state detecting means for detecting if the unburned component adsorbing means 8 is in a desorbing state to desorb the unburned component. The adsorbent 10 in the unburned component adsorbing means 8 has a characteristic such that the unburned component (hydrocarbon) discharged into the exhaust system 7 is adsorbed during the cold start of the internal combustion engine E; the desorption of the unburned component is started when the temperature of the adsorbent 10 reaches a given desorption-starting temperature $T_1$, and the desorption of the unburned component is substantially completed when the temperature of the adsorbent 10 reaches a given desorption-end temperature $T_2$. Thus, a condition in which the temperature T detected by the temperature detector 14 is in a range of $T_1 < T < T_2$ indicates when the unburned component adsorbing means 8 is in the desorbing state.

Detection values detected by the upstream air-fuel ratio detecting means 12, the downstream air-fuel detecting means 13 and the temperature detector 14 are provided to a determining means 15 which comprises a computer. The determining means 15 judges or determines the adsorbing ability or capacity of the unburned component adsorbing means 8 on the basis of detection values detected by the upstream and downstream air-fuel ratio detecting means 12 and 13 when the temperature detector 14 determines that the unburned component adsorbing means 8 is in the desorbing state. In order to determine conditions for determining adsorbing capacity, the following detectors are connected to the determining means 15: an intake pressure detector 16 for detecting an intake pressure $P_B$ at a location downstream from the throttle valve 3; a water-temperature detector 17 for detecting a temperature of cooling water in the internal combustion engine E; and a revolution-number or engine speed detector 18 for detecting a number $N_E$ of revolutions per minute of the internal combustion engine E.

Figure 2:
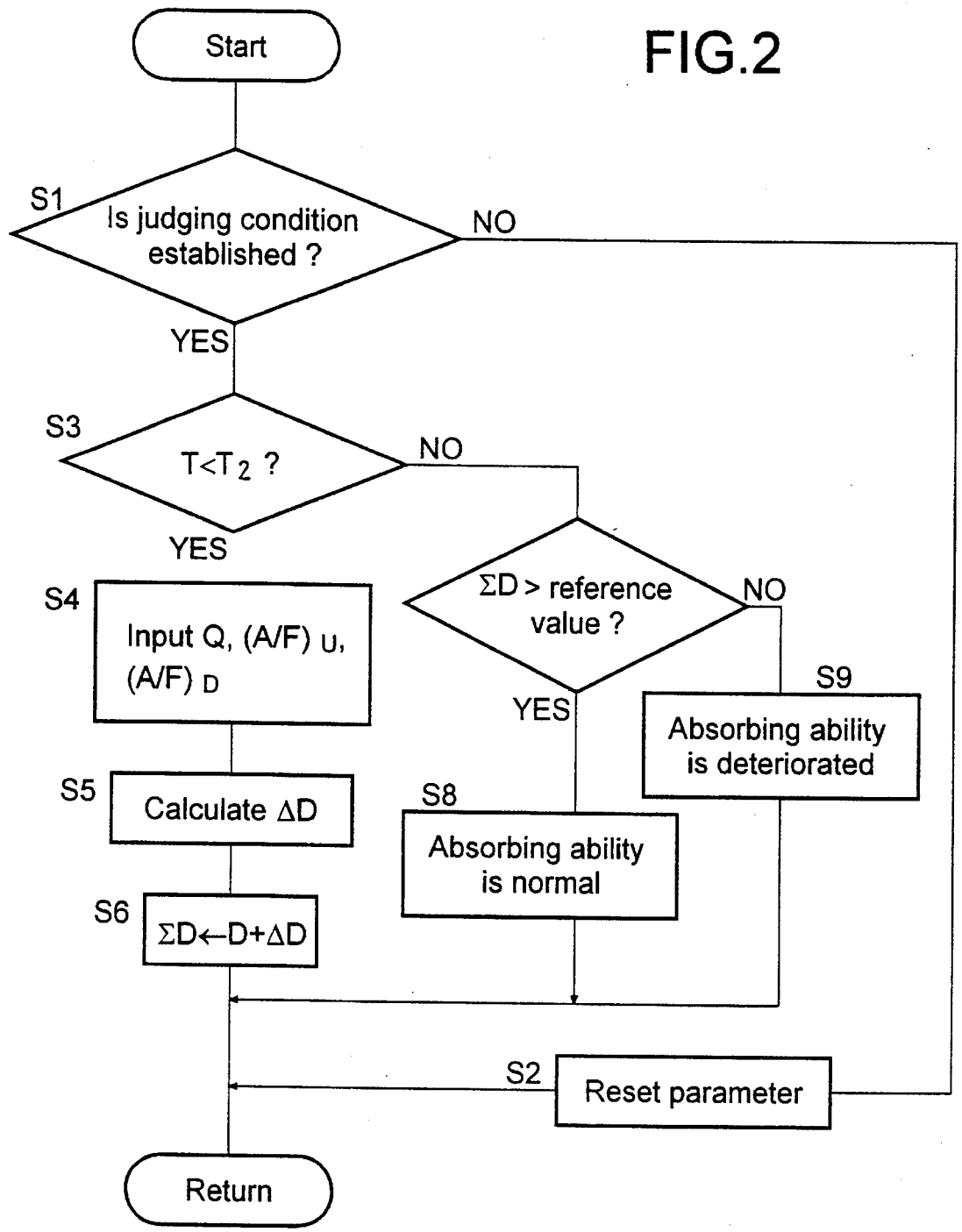
FIG. 2 is a flow chart illustrating a method for determining the adsorbing capacity at the adsorbing means in accordance with the present invention.

The determining means 15 determines the capacity according to the method shown in FIG. 2. The capacity determination is carried out, for example, at continuous predetermined time intervals after the start of the engine. At Step S1 in FIG. 2, it is determined whether or not all the following conditions (1) to (4) exist in order to decide whether to carry out the capacity determination:

$$T_W < T_{WO} \quad (1)$$

$$N_{EL} < N_E < N_{EH} \quad (2)$$

$$P_B < P_{BO} \quad (3)$$

$$T > T_1 \quad (4)$$

wherein $T_{WO}$ is a preset water temperature; $N_{EL}$ is a preset low number of revolutions per minute; $N_{EH}$ is a preset high number of revolutions per minute; and $P_{BO}$ is a preset intake pressure.

If it is decided at Step S1 that the conditions for carrying out the capacity determination are not established, various parameters, i.e., $T_{WO}$, $N_E$, $P_B$ and T, are reset at Step S2. If it is decided at Step S1 that the conditions have been established, the processing is advanced from Step S1 to Step S3 where it is determined whether or not $T<T_2$ is established. In other words, it is determined at Step S1 and Step S3 whether or not $T_1<T<T_2$, i.e., whether or not the unburned component adsorbing means 8 is in a desorbing state. If $T<T_2$, the processing is advanced to Step S4.

At Step S4, an amount Q grams/sec (g/sec) of air drawn into the internal combustion engine E and the air-fuel ratios $(A/F)_U$ and $(A/F)_D$ at upstream and downstream sides of the unburned component adsorbing means 8 are provided. The amount Q (g/sec) of air drawn may be read from a map previously established in accordance with the number $N_E$ of revolutions per minute of the engine and the intake pressure $P_B$, or may be detected by an air flow meter previously placed in the internal combustion engine E.

At Step S5, a desorption amount $\Delta D$ at every time interval $\Delta t$ in execution of the processing shown in FIG. 2, is calculated according to a following expression (5):

$$\Delta D = Q \times \{1/(A/F)_U\} - \{1/(A/F)_D\} \times \Delta t \quad (5)$$

At Step S6, a value $\Sigma D$ of the addition of the desorption amounts is calculated. More specifically, at Step S6, a total desorption amount $\Sigma D$ is calculated for the period when $T_1<T<T_2$ and the unburned component adsorbing means 8 is in the desorbing state.

When $T \geq T_2$ after passage of the desorbing state, the processing is advanced from Step S3 to Step S7. When the total desorption amount $\Sigma D$ exceeds a predetermined reference value at Step S7, it is decided at Step S8 that the adsorbing capacity of the unburned component adsorbing means 8 is normal. On the other hand, when the total desorption amount $\Sigma D$ is equal to or less than the predetermined reference value, it is decided at Step S9 that the adsorbing capacity of the unburned component adsorbing means 8 has deteriorated.

The operation of this embodiment will be described below. When the temperature of the catalyst 11 in the exhaust emission control catalytic converter 9 does not reach an activating temperature as in a cold start of the internal combustion engine E, the unburned component in exhaust gas is adsorbed into the adsorbent 10 in the unburned component adsorbing means 8 and thus prevented from being released to the atmosphere. If the temperature of the adsorbent 10 in the unburned component adsorbing means 8 reaches the desorption starting temperature $T_1$ due to a rise in temperature of exhaust gas as a result of continuation of the operation of the internal combustion engine E, the desorption of the adsorbed unburned component from the adsorbent 10 is started. However, the temperature of the catalyst 11 has also risen and hence, the desorbed unburned component is converted in the exhaust emission control catalytic converter 9.

The determining means 15 ensures that in a condition in which it can be decided, on the basis of the detection value detected by the temperature detector 14, that the unburned component adsorbing means 8 is in the desorbing state to desorb the unburned component, the total desorption amount $\Sigma D$ is calculated from the detection values of the air-fuel ratios $(A/F)_U$ and $(A/F)_D$ in the exhaust gas at the upstream and downstream sides of the unburned component adsorbing means 8. When the total desorption amount $\Sigma D$ is equal to or less than the reference value, it is determined that the adsorbing capacity of the unburned component adsorbing means 8 has deteriorated. Thus, it is possible to reliably and easily determine the adsorbing capacity during operation of the internal combustion engine E. When it is determined that the adsorbing capacity has deteriorated, the replacement of the adsorbent 10 is indicated by an alarm means such as an alarm lamp, whereby the adsorbent can be replaced by new adsorbent to prevent the release of the unburned component to the atmosphere.

In the above-described embodiment, the upstream air-fuel ratio detecting means 12 for detecting the air-fuel ratio $(A/F)_U$ in the exhaust gas at the location upstream of the unburned component adsorbing means 8 is provided in the exhaust system 7. When a feedback control for controlling the air-fuel ratio in the exhaust to a given value in the desorbing state is carried out, the upstream air-fuel ratio detecting means 12 may be omitted, and the air-fuel ratio $(A/F)_U$ at the upstream side may be determined at a given value. In place of provision of the temperature detector 14 as the unburned component adsorbing state detecting means on the unburned component adsorbing means 8, the temperature may be estimated from a value of addition of the amounts of fuel injected by the fuel injection valve 4. Further, in place of determining of the adsorbing capacity of the unburned component adsorbing means 8 when in the desorbing state, an adsorption amount in the adsorbing state up to a time point when the temperature T reaches the desorption starting temperature $T_1$, may be calculated to determine the adsorbing capacity.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

We claim:

1. An adsorbing capacity determining apparatus in an exhaust control system for an internal combustion engine, said exhaust control system including an unburned component adsorbing means for temporarily adsorbing or desorbing an unburned component in exhaust gas from the engine, said capacity determining apparatus comprising:

(a) upstream air-fuel ratio detecting means positioned upstream from said unburned component adsorbing means;

(b) downstream air-fuel ratio detecting means positioned downstream from said unburned component adsorbing means;

(c) an unburned component adsorbing state detecting means, coupled to said unburned component adsorbing means, for detecting the adsorbing or desorbing state of the unburned component adsorbing means; and (d) determining means, coupled to the outputs of said upstream air-fuel ratio detecting means, said downstream air-fuel ratio detecting means, and said unburned component adsorbing state detecting means, for determining the adsorbing capacity of said unburned component adsorbing means as a function of the outputs of said upstream air-fuel ratio detecting means and said downstream air-fuel ratio detecting means, when said unburned component adsorbing state detecting means detects that said unburned component adsorbing means is in either the adsorbing state or the desorbing state.

2. An adsorbing determining apparatus as set forth in claim 1, wherein said unburned component adsorbing state detecting means is a temperature sensor means for determining the temperature of said unburned component adsorbing means.

3. An adsorbing capacity determining apparatus as set forth in claim 2, wherein said determining means determines the total desorption amount $\Sigma D$ during the time period when the temperature of said unburned component adsorbing means is between first and second predetermined temperatures where:

$$\Sigma D \leftarrow D + \Delta D$$

and $$\Delta D = Q[\{1/(A/F)_U\} - \{1/(A/F)_D\}]\Delta t$$

where $Q$=air drawn into the engine $\Delta t$=time interval between calculations.

* * * * *